United States Patent [19]

Kreitchman et al.

[11] Patent Number: 4,561,468
[45] Date of Patent: Dec. 31, 1985

[54] VALVE FOR USE IN JET ENGINE SYSTEMS AND THE LIKE

[75] Inventors: Morton A. Kreitchman, South Orange; Kurt Arnold, West Caldwell, both of N.J.

[73] Assignee: Valcor Engineering Corporation, Springfield, N.J.

[21] Appl. No.: 369,664

[22] Filed: Apr. 19, 1982

[51] Int. Cl.⁴ ..................... F16K 31/12; F16K 31/40
[52] U.S. Cl. ................... 137/625.5; 137/508
[58] Field of Search ............... 137/508, 625.5; 251/368

[56] References Cited

U.S. PATENT DOCUMENTS

| | | | |
|---|---|---|---|
| 3,334,647 | 8/1967 | Whitelaw | 137/625.5 X |
| 3,635,247 | 1/1972 | Myers | 137/625.5 |
| 3,924,651 | 12/1975 | Hippel et al. | 137/625.5 X |
| 4,026,464 | 5/1977 | Doherty, Jr. | 137/625.5 X |
| 4,108,205 | 8/1978 | Hawley | 137/625.5 X |
| 4,224,962 | 9/1980 | Orszullok | 137/625.5 X |
| 4,250,920 | 2/1981 | Traylor | 137/625.5 X |

Primary Examiner—Alan Cohan
Assistant Examiner—John A. Rivell
Attorney, Agent, or Firm—Darby & Darby

[57] ABSTRACT

A valve is formed with a valve chamber and with an entrance port, a first exit port and a relief exit port each of which communicates with the chamber. A valve member is movably mounted within the chamber, and a pair of valve seats is mounted within the chamber for cooperation with the valve member, one of the seats being movable. The valve member and movable seat are biased in such a manner that the valve is normally seated with respect to both seats. When fluid in the entrance port exceeds a certain crack pressure, the movable seat moves away from the valve member and the fluid flows out the relief exit port. To stop flow out the relief exit port without creating a pressure surge, the valve member, actuated by a control, seats against the movable seat and at the same time moves away from the other seat so that the fluid continues to circulate through the first-named exit port. The valve is particularly adapted for efficient control of the flow of fuel during start-up, operation and shutdown of the jet engine of an aircraft.

1 Claim, 3 Drawing Figures

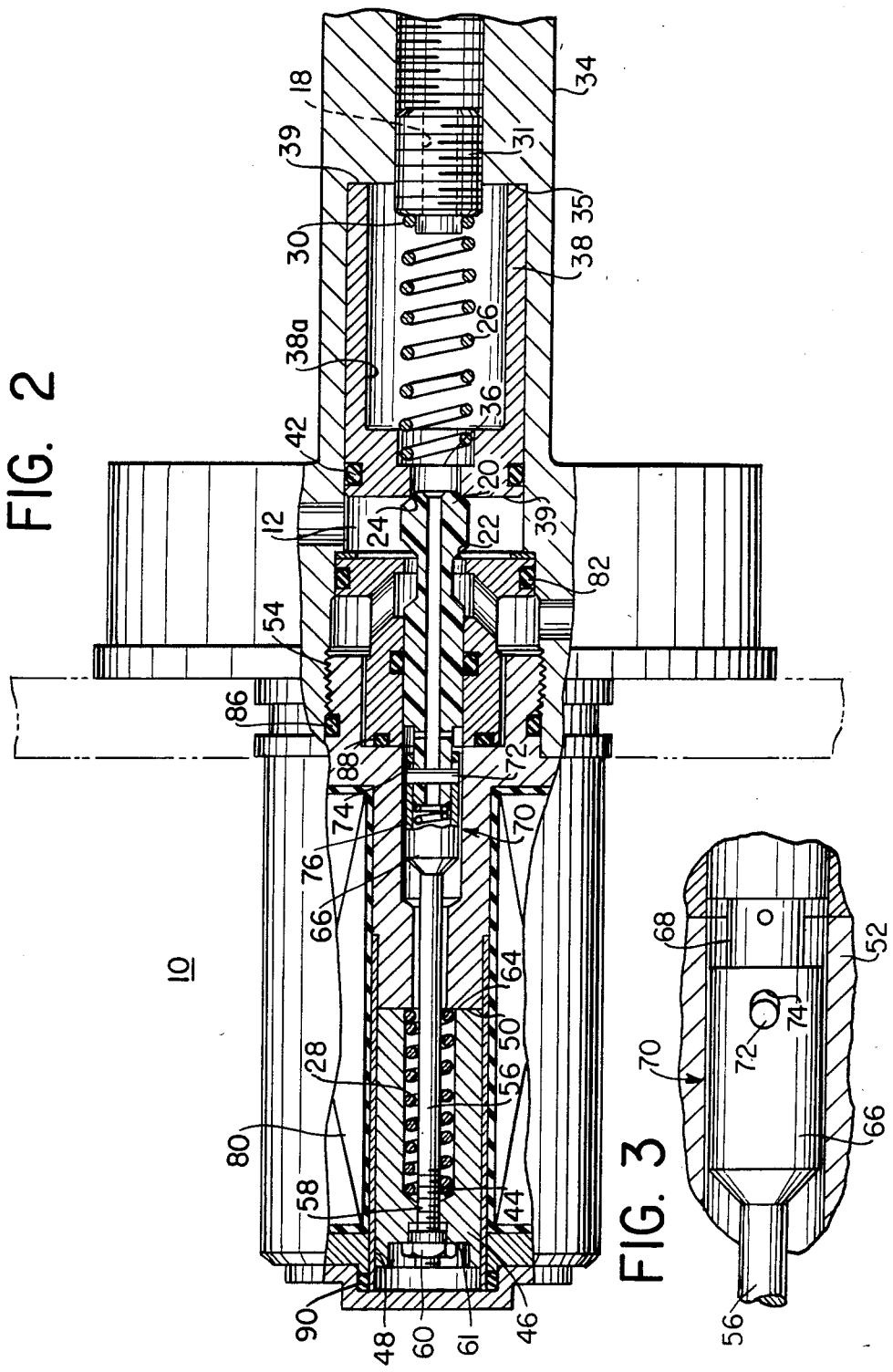

VALVE FOR USE IN JET ENGINE SYSTEMS AND THE LIKE

BACKGROUND OF THE INVENTION

This invention relates to valves and, more particularly, to a novel and highly effective valve for controlling the flow of a fluid under pressure.

Valves are among the most critical elements of many mechanical systems. For example, the jet engines in commercial, business and military aircraft depend on valves for controlling the flow of jet fuel reliably and without pressure surges or spikes during start-up, operation and shutdown.

Reliability is one of the most important desiderata in aircraft engines. For a number of reasons, including their rotating as opposed to reciprocating movement, the jet engines used in modern commercial, business and military aircraft are generally very reliable as compared to reciprocating engines. An engine is no more reliable, however, than the system that supplies fuel to it.

A fuel system must ensure the delivery of fuel to the engine under closely controlled pressure during start-up and operation, immediate cutoff of fuel during engine shutdown, and avoidance of surges or pressure spikes at all times.

The last requirement presents a particular challenge. Normal operating pressure of a jet engine fuel system is, say, 54 pounds per square inch. Abrupt shutoff of fuel under such high pressure tends to produce a sudden, steep pressure surge or spike. In order to fly efficiently, airplanes and their components, including fuel lines, tanks and valves, must be as light as possible, and hence tend to be fragile and subject to rupture by excessive pressure spikes. Jet fuel is highly flammable, and ignition of jet fuel flowing from a rupture in the fuel system is extremely hazardous.

Because of the importance of the problem, a great deal of attention has been given to the design of light, simple, reliable valves for use in jet engine fuel systems and other environments where the control of fluid flow is of critical importance. The best prior example of such a valve known to the applicants is the MK 81181-1 valve produced by the assignee of the present invention. This prior valve comprises a poppet valve member that can be moved between two seats and normally engages one of the seats. Behind the second seat is a spring-biased relief valve normally biased to the closed position. When fuel in the system reaches a certain "crack" pressure, it forces open the spring-biased relief valve and flows to the jet engine. Shutoff is achieved by energizing the poppet valve, which then moves away from the first seat and engages the second, thus blocking flow to the engine but permitting recirculating flow through the first seat and preventing a pressure surge.

While the prior structure provides many benefits, it has more parts and greater weight than one would ideally desire in a valve used in the fuel system of an aircraft engine.

SUMMARY OF THE INVENTION

An object of the invention is to remedy the problems outlined above and, in particular, to provide a valve that is particularly adapted for use in the fuel system of a jet aircraft engine and is simpler in construction and lighter in weight than valves available heretofore for use in similar environments.

Another object of the invention is to provide a basic valve design which is adapted through proper selection of the directions and magnitudes of the forces generated by various components of the structure to a wide range of uses other than in jet engine fuel systems.

The foregoing and other objects are attained in accordance with the present invention by providing a valve formed with a valve chamber and with an entrance port, a first exit port and a relief exit port each of which communicates with the chamber. The valve comprises a movable valve member mounted within the chamber, a pair of valve seats mounted within the chamber for cooperation with the valve member, at least one of the seats being movably mounted, and means for biasing the valve member and at least the movable seat in such a manner that the valve member is normally seated with respect to both seats. Control means is provided actuable for urging the valve member in a direction away from a selected one and towards the other of the seats. The directions and magnitudes of the respective forces generated by the biasing means and the control means are such that:

(1) when the entrance port contains a fluid under a pressure less than a certain operating pressure the valve member normally engages both of the seats, and fluid is blocked from both of the exit ports; and (2) when the entrance port contains a fluid under a pressure greater than a certain crack pressure the fluid forces the movable seat in a direction away from the other of the seats, so that the valve member selectively engages one or the other of the seats and the fluid flows out one or the other of the exit ports in accordance with the condition of the control means.

The biasing means may be a composite structure including a portion that urges the valve member in a direction away from the movable seat. The crack pressure mentioned above may then exceed the operating pressure, so that, when the entrance port contains a fluid under a pressure greater than the operating pressure and less than the crack pressure, the valve functions as an on-off valve, selectively enabling or blocking flow from the entrance port to one of the exit ports in accordance with the condition of the control means.

The biasing means may also be a composite structure including a portion that urges the valve member in a direction towards the movable seat. In this case, the crack pressure equals the operating pressure.

In the preferred embodiment of the invention, the biasing means is a composite structure comprising a first spring urging the movable seat against the valve member and a second spring urging the valve member against the other seat. Means may be provided for adjusting the tension of the first and second springs.

A third spring and a lost-motion mechanism are preferably provided for indirectly connecting the valve member to the second spring for absorbing shock when the valve member moves in response to actuation of the actuating means.

In order to eliminate the necessity of providing separate rubber seals, the valve member preferably comprises a material selected from the group consisting of metal and plastic and each of the seats comprises a material selected from the other member of the same group. The valve member is preferably made of polyimide and each of the seats is preferably made of stainless steel.

An O-ring seals the movable seat to the valve chamber and provides inherent damping.

BRIEF DESCRIPTION OF THE DRAWINGS

A better understanding of the invention may be gained from a consideration of the following detailed description of the preferred embodiments thereof, in conjunction with the appended figures of the drawing, wherein:

FIG. 2 is a view similar to FIG. 1 showing the valve in its condition when it cuts off flow of fuel to the jet engine; and FIG. 3 is a view enlarged with respect to FIGS. 1 and 2 showing a portion of the valve structure.

DESCRIPTION OF THE PREFERRED EMBODIMENTS

Figure 1:
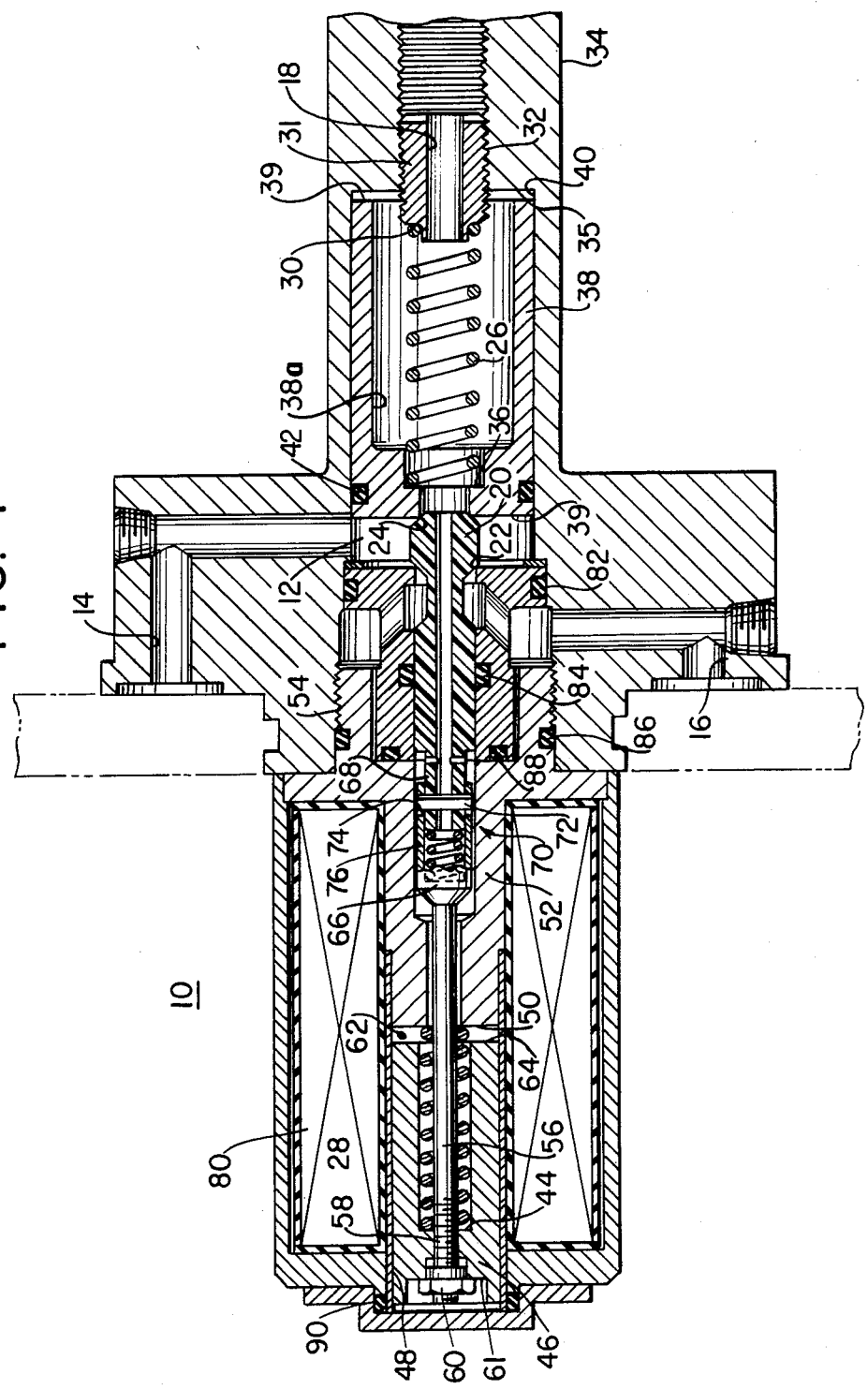
FIG. 1 is an axial sectional view of a preferred embodiment of a valve constructed in accordance with the invention, the valve being in its "normal" or inactivated condition.

FIG. 1 shows a valve 10 constructed in accordance with the invention and in its "normal" or inactivated condition. The valve 10 is formed with a valve chamber 12 (including portions 12a and 12b described in greater detail below) and with an entrance port 14, a first exit port 16 and a relief exit port 18 each of which communicates with the valve chamber 12.

The valve comprises a valve member 20 movably mounted within the chamber 12 and a pair of valve seats 22 and 24 mounted within the chamber 12 for cooperation with the valve member 20. At least one of the valve seats, in the case illustrated the valve seat 24, is movably mounted.

Means is provided for biasing the valve member 20 and at least the movable seat 24 in such a manner that the valve member 20 is normally seated with respect to both of the seats 22 and 24. The biasing means is preferably a composite structure of which one portion includes a compression coil spring 26 that urges the movable seat 24 towards the valve member 20 and another portion includes a compression coil spring 28 that urges the valve member 20 in a direction towards the other seat 22.

Specifically, the valve coil spring 26 bears at one end against a shoulder 30 formed on a plug 31 which is threaded by means 32 into a valve housing member 34. At its opposite end, the coil spring 26 bears against a shoulder 36 of a sleeve or piston 38 on which the movable valve member 24 is formed. The sleeve or piston 38 is mounted slidably within a bore 40 formed within the housing 34. An O-ring 42 forms a seal between the outer wall of the piston 38 and the bore 40.

By adjusting the position of the plug 31, the force normally exerted by the compression coil spring 26 can be adjusted. The adjustment of the plug 31 can be done in any convenient manner, for example by a fitting (not shown) cooperating therewith.

The spring 26 thus forces the piston 38 to the left as seen in FIGS. 1 and 2. The left face 39 (as seen in FIGS. 1 and 2) of the piston 38 is exposed to the pressure of fluid in the entrance port 14. When this pressure becomes sufficient, it forces the piston 38 to the right, as explained in greater detail below.

The compression coil spring 28 bears at the left end as seen in FIGS. 1 and 2 against an interior shoulder 44 of a piston 46 slidably mounted within a sleeve or cylinder 48. The right end of the coil spring 28 as seen in FIGS. 1 and 2 bears against a shoulder 50 of a housing member 52 engaging by means of threads 54 the housing portion 34. The compression coil spring 28 thus urges the piston member 46 to the left as seen in FIGS. 1 and 2. The piston 46 carries a shaft 56 formed with threads 58 and an adjustable nut 60. The nut 60 engages a shoulder 61 formed on the piston 46.

By means of the adjustable nut 60, the space 62 between the right end 64 of the piston 46 and the left face 50 of the housing member 52 can be adjusted when the valve is in the normal or deactivated condition of FIG. 1.

The right end of the shaft 56 is formed with a receptacle 66 for receiving a shaft extension 68 of the valve member 20.

A lost-motion structure 70 comprising a pin 72 extending through the shaft extension 68 and an elongated slot 74 (see FIG. 3, which is a fragmentary view in a direction from the top towards the bottom of FIG. 2) formed in the receptacle 66 allows limited movement of the shaft extension 68 and hence of the valve member 20 with respect to the receptacle 66. A third coil spring 76 biases the shaft extension 68 and hence the valve member 20 towards the right (with respect to the receptacle 66) as seen in FIGS. 1 and 2 and compresses slightly to absorb shock when the valve member 20 seats against the valve seat 24 as shown in FIG. 2.

The control means actuable for urging the valve member 20 in a direction away from a selected one and towards the other of the seats 22 and 24 preferably comprises a solenoid 80. The solenoid 80 when energized develops a magnetic field that causes the piston 46, which is made of a magnetic material, to move to the right as seen in FIGS. 1 and 2.

O-rings 82, 84, 86, 88 and 90 are also provided to ensure that no fuel or other fluid leaks from the valve.

OPERATION

In operation the valve 10 can occupy any of three positions. FIG. 1 shows the "normal" or "first" position of the valve (when used in the fuel system of a jet engine of an aircraft) before engine start-up. The valve member 20 blocks flow of fluid in the entrance port 14 from both exit ports 16 and 18. As fluid pressure is built up in the entrance port 14 by a fuel pump (not shown) during the process of starting the engine, it acts on the left face (as seen in FIG. 1) 39 of the piston 38. When crack pressure is reached, the fluid moves the piston 38 from the position shown in FIG. 1, in which there is a space 41 between the shoulder 35 and the shoulder 39, to the position shown in FIG. 2, in which the space 41 is closed up. The spring 26 compresses to accommodate the movement of the piston 38.

Because of the biasing of the valve member 20 to the left (as seen in FIGS. 1 and 2) by the spring 28, the valve member 20 does not follow the motion of the piston 38 to the riqht; rather, it stays seated with respect to the valve seat 22 and becomes unseated with respect to the valve seat 24. This permits fuel to flow from the entrance point 14, through the valve chamber 12, between the valve member 20 and the valve seat 24, through the passage 38a, and out the relief exit port 18, whence it flows to the jet engine. This is the "second" position of the valve 10 and is the position occupied by the valve 10 during normal operation of the jet engine.

When it is desired to shut down the engine, the solenoid 80 is energized, whereupon the piston 46 moves from the position shown in FIG. 1 to the position shown in FIG. 2, closing up the space 62 (FIG. 1) and moving the valve member 20 from the position shown in FIG. 1, in which it engages the valve seat 22, to the position shown in FIG. 2, in which it moves away from the valve seat 22 and engages the movable valve seat 24 in the retracted position of the latter. FIG. 2 thus shows the "shut-off" or "third" position of the valve 10. In this position of the valve 10, fuel flows from the entrance port 14 (visible in FIG. 1) through the valve chamber 12 and out exit port 16. The chamber 12 includes both four apertures 12a (two of which are visible in FIGS. 1 and 2) disposed at intervals of 90° around the valve axis, and annular portion 12b defined by the fitting 13 and housing members 34 and 52. This diversion of flow during engine shutdown is effected without any pressure surge, since the fuel continues to recirculate through the exit port 16. The engine fuel pump (not shown) can then or later be shut down, whereupon the valve 10 will automatically restore itself to the condition shown in FIG. 1.

ADDITIONAL EMBODIMENTS

The preferred embodiment of the invention described above is particularly adapted for use in a system for supplying fuel to a jet engine. By proper selection of the directions and magnitudes of the respective forces generated by the biasing means 26, 28 and the control means 80, the valve can be made to function in a variety of different ways. For example, if the spring 28 is designed to urge the valve member 20 to the left (as seen in FIGS. 1 and 2), just as in the preferred embodiment described above, it is possible to have an operating pressure below crack pressure such that the force developed by fluid in the entrance port 14 plus the force developed by energizing the coil 80 is sufficient to operate the valve 10 by moving the valve member 20 and movable valve seat 24 to the right and permitting flow out the exit port 16. In this case, the valve 10 functions as an on-off valve. In the off position, the valve 10 also continues to function as a pressure relief valve in that, if crack pressure is reached, the piston 38 will move to the right, permitting fluid flow out the exit relief port 18.

In another embodiment of the invention, the spring 28 urges the valve member 20 to the right (as seen in FIGS. 1 and 2), so that the valve member 20 will follow the motion of the piston 38 when the latter moves to the right under the fluid pressure generated in the entrance port 14. In this case, when crack pressure is reached, fluid flows out the exit 16 instead of out the exit 18. The bias exerted by actuating the coil 80 can then be selected to move the valve member 20 to the left as seen in FIGS. 1 and 2 thereby cutting off flow through the exit 16 and enabling flow through the exit 18.

Thus there is provided in accordance with the invention a novel valve that is particularly adapted for use in the fuel system of an aircraft jet engine but which is easily modified and adapted to other uses. The valve has many advantages including that a relief seat and a valve seat are common elements, that the seats eliminate the need for separate rubber seals while reliably preventing leakage, that relief piston damping is provided by an O-ring seal, that flow of fuel under pressure to a jet engine can be suddenly cut off without creating dangerous pressure spikes, and that weight is reduced and reliability is improved because of a reduction in the number of parts and the elimination of critical fits.

Many modifications of the preferred embodiments of the invention disclosed herein will readily occur to those skilled in the art upon a consideration of this disclosure. Accordingly, the invention includes all of the structure which is within the scope of the appended claims.

What is claimed is:

1. A valve formed with a valve chamber and with an entrance port, a first exit port and a relief exit port each of which communicates with said chamber and comprising:

a valve member movably mounted within said chamber, a pair of valve seats mounted within said chamber for cooperation with said valve member, at least one of said seats being movably mounted, means for biasing said valve member and at least said movable seat in such a manner that said valve member is normally seated with respect to both of said seats, and control means actuable for urging said valve member in a direction away from a selected one and towards the other of said seats, the directions and magnitudes of the respective forces generated by said biasing means and said control means being such that (1) when said entrance port contains a fluid under a pressure less than a certain operating pressure said valve member normally engages both of said seats, and said fluid is blocked from both of said exit ports, and (2) when said entrance port contains a fluid under a pressure greater than a certain crack pressure said fluid forces said movable seat in a direction away from the other of said seats, so that said valve member selectively engages one or the other of said seats and said fluid flows out one or the other of said exit ports in accordance with the condition of said control means;

wherein said biasing means is a composite structure comprising a first spring urging said movable seat against said valve member and a second spring urging said valve member against said other seat, further comprising structure including a third spring and a lost-motion mechanism indirectly connecting said valve member to said second spring for absorbing shock when said valve member moves in response to actuation of said actuating means.

* * * * *